United States Patent
Muramatsu et al.

(10) Patent No.: US 11,492,553 B2
(45) Date of Patent: Nov. 8, 2022

(54) POLY(VINYL ALCOHOL)-BASED RESIN, DISPERSING AGENT AND DISPERSING AGENT FOR SUSPENSION

(71) Applicant: Mitsubishi Chemical Corporation, Tokyo (JP)

(72) Inventors: Yusuke Muramatsu, Tokyo (JP); Yoshihito Yamauchi, Tokyo (JP)

(73) Assignee: MITSUBISHI CHEMICAL CORPORATION, Tokyo (JP)

( * ) Notice: Subject to any disclaimer, the term of this patent is extended or adjusted under 35 U.S.C. 154(b) by 0 days.

(21) Appl. No.: 16/682,532

(22) Filed: Nov. 13, 2019

(65) Prior Publication Data

US 2020/0078754 A1 Mar. 12, 2020

Related U.S. Application Data

(63) Continuation of application No. PCT/JP2018/018826, filed on May 15, 2018.

(30) Foreign Application Priority Data

May 16, 2017 (JP) .............................. JP2017-097160

(51) Int. Cl.
  *C09K 23/00* (2022.01)
  *C08L 29/04* (2006.01)
(52) U.S. Cl.
  CPC .............. *C09K 23/00* (2022.01); *C08L 29/04* (2013.01); *C08L 2205/025* (2013.01); *C08L 2205/14* (2013.01)
(58) Field of Classification Search
  CPC ................ C08F 16/06; C08F 18/02–08; C08F 118/04–08; C08F 218/04–08
  See application file for complete search history.

(56) References Cited

U.S. PATENT DOCUMENTS

| | | |
|---|---|---|
| 5,780,547 A | 7/1998 | Saeki et al. |
| 5,977,273 A | 11/1999 | Saeki et al. |
| 2004/0152834 A1 | 8/2004 | Kato et al. |
| 2004/0186232 A1 | 9/2004 | Shibutani |
| 2006/0180956 A1 | 8/2006 | Kato et al. |
| 2010/0190890 A1 | 7/2010 | Michel et al. |
| 2017/0226247 A1 | 8/2017 | Kumaki et al. |

FOREIGN PATENT DOCUMENTS

| | | |
|---|---|---|
| CN | 1506383 A | 6/2004 |
| CN | 1519271 A | 8/2004 |
| JP | 5-105702 | 4/1993 |
| JP | 8-269112 | 10/1996 |
| JP | 8-283313 | 10/1996 |
| JP | 2004-189889 | 7/2004 |
| JP | 2004-250695 | 9/2004 |
| JP | 2010-533761 | 10/2010 |
| JP | 2012-188489 | 10/2012 |
| TW | 201619217 A | 6/2016 |
| WO | 2016-141256 A1 | 9/2016 |

OTHER PUBLICATIONS

European OA issued in in European patent application No. 18801519.2 dated Sep. 21, 2020.
Extended European Search Report in European patent application No. 18801519.2 dated Feb. 3, 2020.
ISR issued in WIPO Patent Application No. PCT/JP2018/018826, dated Jul. 17, 2018, English translation.
Written Opinion of Int'l Searching Authority in WIPO Pat. App. No. PCT/JP2018/018826, dated Jul. 17, 2018, English translation.
IPRP issued in WIPO Patent Application No. PCT/JP2018/018826, dated Nov. 19, 2019, English translation.
Office Action issued in TW Patent Application No. 107116519, dated Nov. 25, 2021, English translation.
Office Action issued in CN Patent Application No. 201880032357.4, dated Dec. 3, 2021, English translation.
Office Action issued in Japanese Patent Application No. 2018-526265, dated Jul. 27, 2021, English translation.

*Primary Examiner* — Ana L. Woodward
(74) *Attorney, Agent, or Firm* — Greenblum & Bernstein, P.L.C.

(57) ABSTRACT

An object of the present invention is to provide a PVA-based resin having a small distribution in degree of heat treatment in which the degree of heat treatment does not depend on a particle diameter. The polyvinyl alcohol-based resin of the present invention has an absorbance at 280 nm of 0.3 or more when being made to a 0.1 wt % aqueous solution and satisfies the following Formula (1): $0.9 \leq X_1/Y_1 \leq 1.2$ (in Formula (1), $X_1$ represents an absorbance at 320 nm of a 0.1 wt % aqueous solution of a polyvinyl alcohol-based resin having a particle diameter larger than 1000 μm and 1680 μm or less, and $Y_1$ represents an absorbance at 320 nm of a 0.1 wt % aqueous solution of a polyvinyl alcohol-based resin having a particle diameter larger than 212 μm and 500 μm or less).

10 Claims, No Drawings

POLY(VINYL ALCOHOL)-BASED RESIN, DISPERSING AGENT AND DISPERSING AGENT FOR SUSPENSION

CLAIM FOR PRIORITY

This application is a Continuation of PCT/JP2018/018826 filed May 15, 2018, and claims the priority benefit of Japanese application 2017-097160 filed May 16, 2017, the contents of which are expressly incorporated by reference herein in their entireties.

TECHNICAL FIELD

The present invention relates to a polyvinyl alcohol-based resin (hereinafter, polyvinyl alcohol also referred to simply as "PVA-based resin"), more specifically to a PVA-based resin suitable as a dispersing agent for use in suspension polymerization of vinyl chloride in the production of polyvinyl chloride, and a dispersing agent and a dispersing agent for suspension polymerization containing the PVA-based resin.

BACKGROUND ART

In the related art, PVA-based resins are used as various dispersing agents, and are also used as dispersing agents (for example, a dispersing agent for emulsion polymerization and a dispersing agent for suspension polymerization) during polymerization of monomers.

In addition, as a method for industrially producing a vinyl chloride resin, a method of subjecting a vinyl chloride monomer or a mixture of a vinyl chloride monomer and a monomer copolymerizable with the vinyl chloride monomer to suspension polymerization is known. During the polymerization, a dispersing agent (also referred to as a dispersion stabilizer) such as a PVA-based resin, methylcellulose, a vinyl acetate-maleic anhydride copolymer, gelatin or the like is used. Among these, various PVA-based dispersion stabilizers have been studied in order to improve physical properties of the obtained vinyl chloride polymer (resin) particles, such as bulk density, particle diameter distribution, porosity, plasticizer absorbability, and residual monomer. Among the PVA-based dispersion stabilizers, from the viewpoint of improving the surface activity of the PVA-based dispersion stabilizers, a dispersion stabilizer of the PVA-based resin that focuses on the carbonyl group and the vinylene group adjacent thereto in the PVA molecule has been proposed.

The PVA-based resin is subjected to a heat treatment to cause a dehydration or deacetylation reaction to generate a vinylene group in the main chain, and is used for applications such as dispersion stabilizers for suspension and water retention materials during the production of polyvinyl chloride. It is also known to improve the strength by subjecting a film-like or fibrous PVA-based resin to a heat treatment.

The vinylene group in the PVA-based resin can be measured particularly by using an ultraviolet absorption spectrum of a 0.1 wt % aqueous solution. Those having a peak near 215 nm belong to the structure [—CO—CH═CH—], those having a peak near 280 nm belong to the structure [—CO—(CH═CH)$_2$—], and those having a peak near 320 nm belong to the structure [—CO—(CH═CH)$_3$—].

As a stabilizer for suspension polymerization, various heat-treated PVA-based resins have been studied.

For example, a dispersion stabilizer for suspension polymerization, in which a divalent or trivalent metal is further added to a PVA-based resin having a carbonyl group, is disclosed (see, for example, Patent Literature 1). In addition, a PVA of a specific block character has been proposed (see, for example, Patent Literature 2). Further, a PVA satisfying all conditions of carbonyl group, block character, absorbance, and the like has also been proposed (see, for example, Patent Literature 3) in recent years.

CITATION LIST

Patent Literature

Patent Literature 1: JP-A-H08-269112
Patent Literature 2: JP-A-H08-283313
Patent Literature 3: JP-A-2004-250695

SUMMARY OF INVENTION

Technical Problem

However, in Patent Literature 1, since a solution containing a metal compound is added to a saponified PVA-based resin in order that the resin contains a metal salt or hydroxide, then a solvent is shaken off, and the PVA-based resin after shaking (usually, after shaking, the solvent during saponification is contained in 40 wt % or more) is subjected to a heat treatment at a high temperature of 110° C., there is a possibility that the solvent present near the surface of the resin is volatilized rapidly and the inside of the resin is not dry. In addition, since at the initial period of the heat treatment, heat is used to volatilize the solvent, and the heat is applied to the PVA-based resin from a part where the solvent is volatilized, there is a possibility that before the solvent in the resin is completely volatilized, the heat is applied from the vicinity of the surface, unevenness can be generated at a position where the heat is applied, and a distribution in degree of the heat treatment between the particles and within the particles can occur.

In addition, in Patent Literature 2, the PVA-based resin obtained by drying is subjected to a heat treatment at 60° C.; however, since about 3 wt % to 10 wt % of the solvent is contained during the drying of the PVA-based resin usually, there are possibilities that the drying is not enough, a distribution between the particles and within the particles where the heat is applied can occur, similar to Patent Literature 1, and a distribution can similarly occur between the particles and within the particles, but the degree is lower than that in Patent Literature 1.

In Patent Literature 3, a melting heat treatment using an extruder does not cause a problem with respect to the distribution of the degree of heat treatment between the particles and within the particles in the heat treatment; however, the molten resin is usually cooled in a water bath, while the PVA-based resin is water-soluble, and it is difficult to cool the molten resin treated at a high temperature, resulting in poor productivity.

Solution to Problem

The present inventors conducted intensive studies in view of the above problems, and found that a PVA-based resin having a small distribution of a degree of heat treatment in which the degree of heat treatment does not depend on a particle diameter can be obtained by bringing a ratio of absorbance at a specific wavelength of a PVA-based resin having a large particle diameter to absorbance at a specific wavelength of a PVA-based resin having a small particle diameter close to 1. Thus, the present invention has been completed.

Namely, the gist of the present invention is in the following <1> to <7>.

<1> A polyvinyl alcohol-based resin containing at least: a polyvinyl alcohol-based resin having a particle diameter larger than 1000 μm and 1680 μm or less; and a polyvinyl alcohol-based resin having a particle diameter larger than 212 μm and 500 μm or less, wherein an absorbance at 280 nm of a 0.1 wt % aqueous solution of the polyvinyl alcohol-based resin is 0.3 or more and the polyvinyl alcohol-based resin satisfies the following Formula (1):

$$0.9 \leq X_1/Y_1 \leq 1.2 \quad (1)$$

(in Formula (1), $X_1$ represents an absorbance at 320 nm of a 0.1 wt % aqueous solution of the polyvinyl alcohol-based resin having a particle diameter larger than 1000 μm and 1680 μm or less, and $Y_1$ represents an absorbance at 320 nm of a 0.1 wt % aqueous solution of the polyvinyl alcohol-based resin having a particle diameter larger than 212 μm and 500 μm or less).

<2> The polyvinyl alcohol-based resin according to <1>, further satisfying the following Formula (2):

$$0.8 \leq X_2/Y_2 \leq 1.1 \quad (2)$$

(in Formula (2), $X_2$ represents an absorbance at 280 nm of the 0.1 wt % aqueous solution of the polyvinyl alcohol-based resin having a particle diameter larger than 1000 μm and 1680 μm or less, and $Y_2$ represents an absorbance at 280 nm of the 0.1 wt % aqueous solution of the polyvinyl alcohol-based resin having a particle diameter larger than 212 μm and 500 μm or less).

<3> The polyvinyl alcohol-based resin according to <1> or <2>, wherein a saponification degree of the polyvinyl alcohol-based resin is 60 mol % to 99 mol %.

<4> A dispersing agent, comprising the polyvinyl alcohol-based resin according to any one of <1> to <3>.

<5> A dispersing agent for suspension polymerization, comprising the polyvinyl alcohol-based resin according to any one of <1> to <3>.

<6> A method for producing the polyvinyl alcohol-based resin according to any one of <1> to <3>, the method including: subjecting a polyvinyl alcohol-based resin having a carbonyl group in a molecule to a heat treatment; and causing a dehydration or deacetylation reaction to take place, wherein drying is performed before the heat treatment.

<7> A polyvinyl alcohol-based resin obtained by the method for producing a polyvinyl alcohol-based resin according to <6>.

Advantageous Effects of Invention

According to the present invention, a PVA-based resin having a small distribution in degree of heat treatment is obtained. Therefore, by using such a PVA-based resin, the following effects are obtained: the amount of the PVA-based resin effectively acting during suspension polymerization of vinyl chloride is increased, the number of adsorption points for vinyl chloride particles is increased, and the reaction is uniform.

DESCRIPTION OF EMBODIMENTS

The description of the constituent requirements described below is an example (representative example) of an embodiment of the present invention, and the present invention is not limited to these contents.

In the present invention, the term "(meth)allyl" means allyl or methallyl, the term "(meth)acryl" means acryl or methacryl, and the term "(meth)acrylate" means acrylate or methacrylate.

Hereinafter, the present invention will be described in detail.

The PVA-based resin of the present invention contains at least a PVA-based resin having a particle diameter larger than 1000 μm and 1680 μm or less and a PVA-based resin having a particle diameter larger than 212 μm and 500 μm or less, in which an absorbance at 280 nm of a 0.1 wt % aqueous solution thereof is 0.3 or more and the PVA-based resin of the present invention satisfies the following Formula (1):

$$0.9 \leq X_1/Y_1 \leq 1.2 \quad (1)$$

(in Formula (1), $X_1$ represents an absorbance at 320 nm of a 0.1 wt % aqueous solution of the PVA-based resin having a particle diameter larger than 1000 μm and 1680 μm or less, and $Y_1$ represents an absorbance at 320 nm of a 0.1 wt % aqueous solution of the PVA-based resin having a particle diameter larger than 212 μm and 500 μm or less).

There is a variation in the particle diameter of the obtained PVA-based resin depending on stirring conditions in a saponification step or pulverization conditions in a drying step. In the present invention, the particle diameter of the PVA-based resin is about 10 μm to 3000 μm, and at least a PVA-based resin having a particle diameter larger than 1000 μm and 1680 μm or less and a PVA-based resin having a particle diameter larger than 212 μm and 500 μm or less are contained.

The PVA-based resin of the present invention has an absorbance at 280 nm in an ultraviolet absorption spectrum of 0.3 or more when being made to a 0.1 wt % aqueous solution. When the absorbance at 280 nm of the 0.1 wt % aqueous solution is 0.3 or more, the adsorptivity to vinyl chloride particles is improved. The absorbance at 280 nm of the 0.1 wt % aqueous solution is preferably 0.35 or more, and more preferably 0.4 or more. An upper limit thereof is not particularly limited, and is preferably 0.8 or less, and more preferably 0.7 or less.

In order to make the absorbance at 280 nm 0.3 or more, a method of subjecting a PVA-based resin having a carbonyl group in the molecule to a heat treatment to cause a dehydration or deacetylation reaction can be mentioned, for example. With the above method, since a conjugated double bond is introduced into the PVA-based resin, the absorbance at 280 nm can be 0.3 or more.

The vinylene group in the PVA-based resin can be measured particularly by measuring an ultraviolet absorption spectrum of the 0.1 wt % aqueous solution of the PVA-based resin. Those having a peak near 215 nm belong to the structure [—CO—CH=CH—], those having a peak near 280 nm belong to the structure [—CO—(CH=CH)$_2$—], and those having a peak near 320 nm belong to the structure [—CO—(CH=CH)$_3$—].

As a method of introducing a vinylene group into the PVA-based resin, for example, a vinylene group is introduced into the main chain of the PVA-based resin by subjecting the PVA-based resin having a carbonyl group in the molecule to a heat treatment to cause a dehydration or deacetylation reaction.

The ultraviolet absorption spectrum of the PVA-based resin can be obtained by measuring the absorbance of the 0.1 wt % aqueous solution of the PVA-based resin at wavelengths of 215 nm, 280 nm, and 320 nm using an ultraviolet visible near infrared spectrophotometer (for example, "V-560" manufactured by JASCO Corporation). The measurement is performed using a sample container (cell) having a thickness of 1 cm.

In addition, the PVA-type resin of the present invention satisfies following Formula (1).

$$0.9 \leq X_1/Y_1 \leq 1.2 \quad (1)$$

In Formula (1), $X_1$ represents an absorbance at 320 nm of a 0.1 wt % aqueous solution of the PVA-based resin having a particle diameter larger than 1000 μm and 1680 μm or less, and $Y_1$ represents an absorbance at 320 nm of a 0.1 wt % aqueous solution of the PVA-based resin having a particle diameter larger than 212 μm and 500 μm or less. When $X_1/Y_1$ is too small or too large, the distribution in the degree of heat treatment is large.

In Formula (1), it is preferable that $0.92 \leq X_1/Y_1$ and it is particularly preferable that $0.95 \leq X_1/Y_1 \leq 1.05$. The closer the value of $X_1/Y_1$ is to 1.0, the smaller the distribution in the degree of heat treatment, and the most preferable value is 1.0.

The absorbance ($X_1$) at 320 nm of the 0.1 wt % aqueous solution of the PVA-based resin having a particle diameter larger than 1000 μm and 1680 μm or less, and the absorbance ($Y_1$) at 320 nm of the 0.1 wt % aqueous solution of the PVA-based resin having a particle diameter larger than 212 μm and 500 μm or less are determined by sieving the PVA-based resin in accordance with JIS Z8801-1:2000 "standard sieve" and measuring the absorbance by the method described above.

In addition, the PVA-based resin of the present invention preferably satisfies the following Formula (2):

$$0.8 \leq X_2/Y_2 \leq 1.1 \quad (2)$$

(in Formula (2), $X_2$ represents an absorbance at 280 nm of the 0.1 wt % aqueous solution of the polyvinyl alcohol-based resin having a particle diameter larger than 1000 μm and 1680 μm or less, and $Y_2$ represents an absorbance at 280 nm of the 0.1 wt % aqueous solution of the polyvinyl alcohol-based resin having a particle diameter larger than 212 μm and 500 μm or less).

The absorbance can be determined by the method described above.

When $X_2/Y_2$ is too small or too large, the distribution in the degree of heat treatment is large. In Formula (2), it is preferable that $0.92 \leq X_2/Y_2 \leq 1.1$, and it is particularly preferable that $0.95 \leq X_2/Y_2 \leq 1.05$. The closer the value of $X_2/Y_2$ is to 1.0, the smaller the distribution in the degree of heat treatment, and the most preferable value is 1.0.

In addition, the ratio of the absorbance at 320 nm to the absorbance at 280 nm (320 nm/280 nm) of the PVA-based resin of the present invention when being made to a 0.1 wt % aqueous solution is preferably 0.3 or more, more preferably 0.4 or more, and still more preferably 0.5 or more. When the absorbance ratio is too small, the surface activity tends to decrease and the suspension polymerization stability tends to decrease when the PVA-based resin of the present invention is used as a dispersing agent for suspension polymerization. The upper limit of the absorbance ratio is not particularly limited, and is usually about 3 from the viewpoint of productivity.

In the present invention, examples of a method of producing the PVA-based resin includes a method of subjecting a PVA-based resin having a carbonyl group in the molecule to a heat treatment to cause a dehydration or deacetylation reaction, as described above.

First, a method of introducing a carbonyl group will be described. Examples of such a method include the following methods.

(i) a method of polymerizing a vinyl ester-based monomer, saponifying the obtained polymer, and oxidizing the obtained PVA-based resin with an oxidizing agent such as hydrogen peroxide (ii) a method of performing polymerization in the presence of a chain transfer agent such as aldehydes and ketones during polymerization of a vinyl ester-based monomer, and saponifying the obtained polymer (iii) a method of polymerizing a vinyl ester-based monomer in the presence of 1-methoxy-vinyl acetate or the like and saponifying the obtained polymer (iv) a method of performing polymerization while blowing air during polymerization of a vinyl ester-based monomer and saponifying the obtained polymer The method (ii) above is preferred industrially. Particularly, a method of polymerizing a vinyl acetate monomer in the presence of a chain transfer agent such as aldehydes and ketones and saponifying the obtained polymer to obtain a PVA-based resin containing a carbonyl group is particularly advantageous. Hereinafter, this method will be described in more detail.

Examples of the vinyl ester-based monomer include vinyl formate, vinyl acetate, vinyl propionate, vinyl butyrate, vinyl caprate, vinyl laurate, vinyl palmitate, vinyl stearate, and other linear or branched saturated fatty acid vinyl esters. From the viewpoint of practice, vinyl acetate is preferred, and usually vinyl acetate is used alone or vinyl acetate is used in combination with a fatty acid vinyl ester compound other than vinyl acetate.

As the chain transfer agent used in the method, examples of the aldehydes include acetaldehyde, propionaldehyde, butyraldehyde, and benzaldehyde, and examples of the ketones include acetone, methyl ethyl ketone, hexanone, and cyclohexanone. Among these, aldehydes are preferred, and acetaldehyde is particularly preferred from the viewpoint of productivity such as solvent recovery. The amount of the chain transfer agent added is slightly different depending on a chain transfer constant of the chain transfer agent to be added and the degree of polymerization of a target PVA-based resin, and is 0.1 wt % to 5 wt % and more preferably 0.5 wt % to 3 wt %, with respect to the vinyl ester-based monomer. As a method of charging the chain transfer agent, the chain transfer agent may be charged in batch at an initial period or may be charged during the polymerization reaction, and the molecular weight distribution of the PVA-based resin can be controlled by charging using any method.

The method of polymerizing the vinyl ester-based monomer, especially vinyl acetate, is not particularly limited, and any known polymerization method can be used. Usually, solution polymerization using alcohol such as methanol, ethanol or isopropyl alcohol as a solvent is performed. Of course, bulk polymerization, emulsion polymerization, and suspension polymerization can also be used. In the solution polymerization, the vinyl ester-based monomer can be charged by any means such as split charging or batch charging. The polymerization reaction is performed using a known radical polymerization catalyst such as azobisisobutyronitrile, acetyl peroxide, benzoyl peroxide, lauroyl peroxide, azobisdimethylvaleronitrile, and azobismethoxyvaleronitrile. The reaction temperature is selected from the range of 40° C. to about the boiling point.

At this time, if necessary, a modified PVA-based resin obtained by copolymerizing a vinyl ester-based monomer and a polymerizable monomer can be used. Examples of such a monomer include: olefins such as ethylene, propylene, isobutylene, α-octene, α-dodecene, and α-octadecene; unsaturated acids such as an acrylic acid, a methacrylic acid, a crotonic acid, a maleic acid, a maleic anhydride, an itaconic acid or a salt or a mono- or dialkyl ester thereof; nitriles such as acrylonitrile and methacrylonitrile; amides such as acrylamide and methacrylamide; olefin sulfonic acids such as an ethylene sulfonic acid, an allyl sulfonic acid, a methallyl sulfonic acid or a salt thereof; alkyl vinyl ethers; N-acrylamidomethyltrimethylammonium chloride; allyltrimethylammonium chloride; dimethylallyl vinyl ketone; N-vinylpyrrolidone; vinyl chloride; vinylidene chloride; polyoxyalkylene (meth)allyl ethers such as polyoxyethylene (meth)allyl ether and polyoxypropylene (meth)allyl ether; polyoxyalkylene (meth)acrylates such as polyoxyethylene (meth)acrylate and polyoxypropylene (meth)acrylate; polyoxyalkylene (meth)acrylamides such as polyoxyethylene (meth)acrylamide and polyoxypropylene (meth)acrylamide; polyoxyethylene (1-(meth)acrylamide-1,1-dimethylpropyl) ester; polyoxyethylene vinyl ether; polyoxypropylene vinyl ether; polyoxyethylene allylamine; polyoxypropylene allylamine; polyoxyethylene vinylamine; polyoxypropylene vinylamine; and hydroxy group-containing α-olefins such as 3-buten-1-ol, 4-penten-1-ol and 5-hexen-1-ol, and derivatives such as acylated products thereof. The above monomer can be copolymerized in an amount of about 0.1 mol % to 10 mol %.

In addition, examples of such a monomer include diol-containing compounds such as 3,4-dihydroxy-1-butene, 3,4-diacyloxy-1-butene, 3-acyloxy-4-hydroxy-1-butene, 4-acyloxy-3-hydroxy-1-butene, 3,4-diacyloxy-2-methyl-1-butene, 4,5-dihydroxy-1-pentene, 4,5-diacyloxy-1-pentene, 4,5-dihydroxy-3-methyl-1-pentene, 4,5-diasiloxy-3-methyl-1-pentene, 5,6-dihydroxy-1-hexene, 5,6-diasiloxy-1-hexene, glycerin monoallyl ether, 2,3-diacetoxy-1-allyloxypropane, 2-acetoxy-1-allyloxy-3-hydroxypropane, 3-acetoxy-1-allyloxy-2-hydroxypropane, glycerin monovinyl ether, glycerin monoisopropenyl ether, vinyl ethylene carbonate, and 2,2-dimethyl-4-vinyl-1,3-dioxolane. The above monomer may also be copolymerized in an amount of 0.1 mol % to 10 mol %.

In the saponification, the vinyl ester polymer obtained above is dissolved in an alcohol and the saponification is performed in the presence of an alkali catalyst or an acid catalyst. Examples of the alcohol include methanol, ethanol, and butanol. The concentration of the polymer in the alcohol is selected from the range of 20 wt % to 50 wt %. As the alkali catalyst, for example, alkali catalysts such as hydroxides or alcoholates of alkali metals such as sodium hydroxide, potassium hydroxide, sodium methylate, sodium ethylate and potassium methylate can be used. As the acid catalyst, for example, an aqueous solution of inorganic acids such as hydrochloric acid and sulfuric acid, or organic acids such as p-toluenesulfonic acid can be used.

The amount of such a catalyst used is necessary to be 1 mmol to 100 mmol equivalents with respect to the vinyl ester-based monomer. In such a case, the saponification temperature is not particularly limited, and is usually selected from the range of 10° C. to 70° C., preferably 20° C. to 50° C. The reaction is performed over 2 hours to 3 hours.

The PVA-based resin thus obtained contains a carbonyl group in the molecule, and the content is preferably 0.05 mol % or more, and more preferably 0.1 mol % or more. When the content is too small, the amount of the vinylene group produced tends to be insufficient. The upper limit is usually 3 mol %.

In addition, the saponification degree (measured in accordance with JIS K6726) of the PVA-based resin is preferably 60 mol % to 99 mol %, more preferably 65 mol % to 99 mol %, still more preferably 67 mol % to 90 mol %, and particularly preferably 69 mol % to 88 mol %. When the saponification degree is too low, the solubility of the PVA-based resin in water tends to decrease, the melting point thereof tends to be lowered, and the resin tends to be aggregated and blocked during heat treatment; when the saponification degree is too high, the surface active ability tends to be lowered, the dispersibility of the vinyl chloride monomer tends to be lowered, and a block tends to be formed during the suspension polymerization.

The average degree of polymerization (measured in accordance with JIS K6726) of the PVA-based resin is preferably 100 to 4000, more preferably 150 to 3000, and particularly preferably 200 to 1000. When the average degree of polymerization is too small, protective colloid properties tend to be too low and tend to cause aggregation during the suspension polymerization; when the average degree of polymerization is too large, the amount of the vinylene group at the end of the PVA-based resin tends to decrease and the surface activity tends to decrease.

The PVA-based resin preferably contains a divalent or trivalent metal salt or hydroxide from the viewpoint of promoting the deacetylation reaction. Examples of the divalent or trivalent metal include magnesium, calcium, zinc, and aluminum. Specific examples of the metal salt or hydroxide include magnesium acetate tetrahydrate, calcium acetate, calcium propionate, magnesium butyrate, magnesium carbonate, magnesium hydroxide, zinc acetate, and aluminum hydroxide. Among these, magnesium acetate tetrahydrate and calcium acetate are preferably used since they are dissolved in water and/or methanol and are industrially easy to handle. A method of adding these compounds is not particularly limited as long as they are contained in the above PVA-based resin. The above compounds may be added directly to the paste before saponification or the slurry after saponification. Preferred is a method of dissolving the above compound preferably in an alcohol such as methanol, ethanol and propanol, or water, adding the obtained mixture to a PVA-based resin slurry after saponification in the form of a solution having a concentration of about 3 wt % to 15 wt %, and distributing the solution to the PVA-based resin. The content of the compound in the PVA-based resin is preferably 30 µmol/g to 300 µmol/g, and more preferably 40 µmol/g to 200 µmol/g, with respect to the PVA-based resin. When the content is too small, the amount of the vinylene group produced tends to decrease; when the content is too large, coloring or decomposition of the PVA-based resin tends to be severe.

In the present invention, it is preferable to contain the divalent or trivalent metal salt or hydroxide as described above. However, in addition to these compounds, for example, a monovalent metal compound such as sodium acetate can be used in combination in a range (1 wt % or less with respect to the divalent or trivalent metal salt or hydroxide) not impairing the effects of the present invention.

In the present invention, it is preferable from the viewpoint of introduction efficiency of the vinylene group that the above divalent or trivalent metal salt or hydroxide is contained in the PVA-based resin containing a carbonyl group in advance as described above, and it is also possible to contain a carbonyl group by heat treatment or the like after a PVA-based resin not containing a carbonyl group is made to contain the above divalent or trivalent metal salt or hydroxide.

(Preliminary Drying)

The PVA-based resin obtained as described above is dried after saponification to be a powdery PVA-based resin. In the present invention, when the PVA-based resin is being dried, it is preferable to first perform preliminary drying. Examples of the drying method for preliminary drying include reduced pressure drying, normal pressure drying, and hot air drying. The drying time is usually 10 minutes to 20 hours, and preferably 1 hour to 15 hours. The drying temperature is usually 40° C. to 120° C., more preferably 40° C. to 100° C., and particularly preferably 50° C. or more and less than 80° C.

After the drying, the PVA-based resin usually contains 1 wt % to 10 wt % of a solvent (for example, methanol or ethanol) used in saponification.

(Drying Before Heat Treatment)

A double bond is generated in the molecule by subjecting the PVA-based resin obtained by the preliminary drying to a heat treatment. In the present invention, after the preliminary drying, it is preferable to perform further drying before the heat treatment, that is, to perform drying before heat treatment.

Examples of the method for the drying before heat treatment include the usual drying methods described above, and vacuum drying is particularly preferred from the viewpoint of drying efficiency.

In addition, after the drying before heat treatment, the PVA-based resin is preferably dried until the above solvent is less than 1 wt %.

The pressure for the reduced pressure drying is usually 20 kPa or less, preferably 17.0 kPa or less, and particularly preferably 13.0 kPa or less. When the pressure is too high, it takes time to perform the drying before heat treatment, which is not preferred in a production step. The lower limit of the pressure is better as it is closer to 0 kPa.

As drying conditions in the drying step, the temperature is usually 40° C. to 120° C., preferably 50° C. to 120° C., more preferably 60° C. to 120° C., and particularly preferably 80° C. or more and less than 120° C.

In addition, the time of the drying before heat treatment is appropriately selected in consideration of the above temperature and pressure conditions, the weight of the object to be treated, or the like, and is preferably set within a range of usually 30 minutes to 1200 minutes.

The PVA-based resin of the present invention can be obtained by performing a heat treatment after the above drying before heat treatment to cause a dehydration or deacetylation reaction to form a double bond. The heat treatment method is not particularly limited, and examples thereof include usually a method of subjecting a PVA-based resin to a specific heat treatment. The temperature condition for the heat treatment is preferably 120° C. to 180° C., and more preferably 140° C. to 155° C. When the temperature condition is too low, the desired amount of the vinylene group cannot be obtained; when the temperature condition is too high, degradation due to the heat treatment tends to be severe, and the resin tends to melt and adhesion in a tank tends to increase.

The heat treatment time is preferably 0.5 hour to 6 hours, and more preferably 1.5 hours to 5 hours. When the heat treatment time is too short, the amount of the vinylene group produced tends to decrease; when the heat treatment time is too long, the PVA-based resin tends to be colored or insoluble matters tends to be generated in water.

The above heat treatment is preferably performed in an oxygen atmosphere having an oxygen concentration of 20 vol % or less, and more preferably in an oxygen atmosphere having an oxygen concentration of 3 vol % to 12 vol %. When the oxygen concentration is too high, the coloring of the PVA-based resin tends to be severe, or insolubilization tends to occur. In the heat treatment, those obtained by containing the metal salt mentioned above in a PVA-based resin obtained by a known method can be used. In order to generate a sufficient amount of the vinylene group to obtain good surface activity, the content of the carbonyl group in the PVA-based resin before the heat treatment is preferably 0.03 mol % to 2.5 mol %.

Any device may be used in the above heat treatment, and examples of the above heat treatment include: (1) a method of performing treatment with a heatable mixing device such as a Nauter mixer or a conical dryer; (2) a method of performing treatment with a general stationary dryer; and (3) a method using a flask heated with a heat medium, for example, a method using an evaporator. Among these, a heatable mixing device is preferred from the viewpoint of reducing the distribution of heat treatment in the present invention.

The PVA-based resin thus obtained has an absorbance at 215 nm [belong to the structure of —CO—CH=CH—] of 0.1 or more and preferably 0.3 or more in the ultraviolet absorption spectrum of the 0.1 wt % aqueous solution thereof; has an absorbance at 280 nm [belong the structure of —CO—(CH=CH)$_2$—] of 0.3 or more and preferably 0.35 or more in the ultraviolet absorption spectrum of the 0.1 wt % aqueous solution thereof; and has an absorbance at 320 nm [belong the structure of —CO—(CH=CH)$_3$—] of 0.1 or more and preferably 0.2 or more in the ultraviolet absorption spectrum of the 0.1 wt % aqueous solution thereof. The absorbance ratio represented by 320 nm/280 nm is 0.3 or more, and preferably 0.4 or more. When it is too low, the foaming prevention effect during suspension polymerization of vinyl-based compounds such as vinyl chloride tends to be low.

The saponification degree (measured in accordance with JIS K6726) of the PVA-based resin of the present invention is preferably 60 mol % to 99 mol %, more preferably 65 mol % to 99 mol %, still more preferably 67 mol % to 90 mol %, and particularly preferably 69 mol % to 88 mol %. When the saponification degree is too low, the dispersibility of the PVA-based resin in water tends to decrease; when the saponification degree is too high, the surface active ability tends to be lowered, the dispersibility of the vinyl chloride monomer tends to be lowered, and a block tends to be formed during the suspension polymerization.

In addition, the average degree of polymerization (measured in accordance with JIS K6726) of the PVA-based resin of the present invention is preferably 100 to 4000, more preferably 150 to 3000, and particularly preferably 200 to 1000. When the average degree of polymerization is too small, protective colloid properties tend to be too low and tend to cause aggregation during the suspension polymerization; when the average degree of polymerization is too large, the amount of the vinylene group at the end of the PVA-based resin tends to decrease and the surface activity tends to decrease.

The PVA-based resin of the present invention is useful as a dispersing agent for stably dispersing solid fine particles in a liquid, and particularly useful as a dispersing agent for suspension polymerization.

Next, a suspension polymerization method for a vinyl-based compound (vinyl chloride) using the PVA-based resin of the present invention as a dispersing agent will be described.

During the suspension polymerization, the PVA-based resin of the present invention is usually added as a dispersing agent to water or a heated aqueous medium to disperse a vinyl chloride monomer, and the polymerization is performed in the presence of an oil-soluble catalyst. The PVA-based resin (dispersing agent) can be added in the form of a powder or a solution. When the PVA-based resin has a low saponification degree and is an aqueous dispersion, the PVA-based resin can be added as an aqueous dispersion liquid. Particularly in the form of a solution, when the PVA-based resin is water soluble, the PVA-based resin can be added as an aqueous solution or as a solution after being dissolved in an organic solvent such as an alcohol, a ketone and an ester or a mixed solvent of the organic solvent and water even when the water solubility is low. Even when the saponification degree is low in the aqueous dispersion liquid, the PVA-based resin can be added to the aqueous dispersion liquid as it is in a case of having self-dispersibility in water.

The dispersing agent may be charged in batch at an initial period of the polymerization, or may be split and charged in the middle of the polymerization. The catalyst used may be any oil-soluble catalyst. For example, benzoyl peroxide, lauroyl peroxide, diisopropyl peroxydicarbonate, α,α'-azobisisobutyronitrile, α,α'-azobis-2,4-dimethyl-valeronitrile, acetylcyclohexylsulfonyl peroxide, and a mixture thereof can be used. The polymerization temperature is optionally selected from a range well known to those skilled in the art.

In addition, a known stabilizer other than the PVA-based resin of the present invention, for example, a polymer substance can be used in combination. Examples of the polymer substance include a PVA having an average degree of polymerization of 100 to 4,000 and a saponification degree of 30 mol % to 95 mol % or a derivative thereof. Examples of the derivative of the PVA include a formalized product, an acetalized product, a butyralized product, and an urethanized product of the PVA, and an esterified product of the PVA with a sulfonic acid or a carboxylic acid. Further examples include the above modified PVA-based resin. However, the present invention is not necessarily limited thereto.

In addition, examples of the polymer substance other than the PVA-based resin include: cellulose derivatives such as methylcellulose, ethylcellulose, hydroxymethylcellulose, hydroxypropylmethylcellulose, hydroxybutylmethylcellulose, hydroxyethylcellulose, carboxymethylcellulose, aminomethylhydroxypropylcellulose, and aminoethylhydroxypropylcellulose; starch, tragacanth, pectin, glue, alginic acid or a salt thereof; gelatin, polyvinylpyrrolidone, polyacrylic acid or a salt thereof; polymethacrylic acid or a salt thereof; a copolymer of polyacrylamide, polymethacrylamide or vinyl acetate with an unsaturated acid such as a maleic acid, a maleic anhydride, an acrylic acid, a methacrylic acid, an itaconic acid, a fumaric acid, and a crotonic acid; a copolymer of styrene with the above unsaturated acid; a copolymer of vinyl ether with the above unsaturated acid; and a salt or ester of the above copolymers. Various surfactants or inorganic dispersing agents can be used in combination as an auxiliary during the polymerization, and the PVA-based resin of the present invention can also be used as an auxiliary.

Further, not only homopolymerization of vinyl chloride but also copolymerization of vinyl chloride with a monomer copolymerizable therewith is performed. Examples of the copolymerizable monomer include vinylidene halide, vinyl ether, vinyl acetate, vinyl benzoate, acrylic acid or methacrylic acid and an ester thereof, maleic acid or an anhydride thereof, ethylene, propylene, and styrene. In addition, during the polymerization of vinyl chloride, it is also optional to add a polymerization regulator, a chain transfer agent, a gelation improver, an antistatic agent, a pH adjuster and the like that are to be used as appropriate. The polymerization of vinyl chloride has been mainly described above, but the dispersing agent of the present invention is not necessarily limited to vinyl chloride, and is also used for suspension polymerization of optional vinyl-based compounds such as styrene, methacrylate and vinyl acetate.

EXAMPLES

Hereinafter, although the present invention is demonstrated further more concretely by ways of Examples, the present invention is not limited to following Examples, unless the gist of the present invention is exceeded. Hereinafter, "%" and "part" refer to a weight basis unless otherwise specified.

Example 1

[Production of PVA-Based Resin]

100 parts of vinyl acetate, 1.2 parts of acetaldehyde, 4.7 parts of methanol, and 0.0092% acetyl peroxide (APO) with respect to vinyl acetate were charged into a polymerization tank and the air in the polymerization tank was replaced with nitrogen. Thereafter, polymerization was started at the boiling point by heating, and the polymerization was stopped when a polymerization rate reached 91.8% after 5.7 hours. Next, the unpolymerized vinyl acetate was removed, and the obtained polymer was saponified with sodium hydroxide by a related method, so as to prepare a saponified slurry (solvent: methyl acetate/methanol=8/2 (weight ratio)) of the PVA-based resin (polymerization degree: 650, saponification degree: 72.0 mol %, the amount of carbonyl group: 0.16 mol %) having a resin content of 12%.

Next, a 10% methanol solution of magnesium acetate tetrahydrate as a metal compound was added to the PVA-based resin prepared above at a rate of 350 g with respect to 1 kg of the PVA-based resin, and the mixture was stirred at 25° C. for 1 hour. Thereafter, the mixture was shaken off with Nutsche and dried at 70° C. for 12 hours with a blow dryer (preliminary drying), to obtain a PVA-based resin containing 177 μmol/g of magnesium acetate.

Next, the obtained PVA-based resin was dried in a heat treatment tank at 110° C. for 2 hours under a reduced pressure of 5.33 kPa (drying before heat treatment), then a gas of nitrogen: air=1:1 (volume ratio) was poured into the heat treatment tank at a rate of 100 L/hr, and the heat treatment was performed at 145° C. for 3 hours while maintaining an oxygen concentration at 10%. The characteristics of the PVA-based resin after the heat treatment were as follows. Polymerization degree: 650 (measured in accordance with JIS K6726); saponification degree: 72.0 mol % (measured in accordance with JIS K6726); magnesium acetate: 177 μmol/g (calculated in terms of the amount of magnesium).

[Sieving]

The obtained PVA-based resin was sieved with sieves having nominal apertures of 212 μm, 500 μm, 1,000 μm, and 1,680 μm (JIS Z8801-1:2000 "standard sieve").

[Measurement of Absorbance]

For the measurement of the absorbance in each particle diameter range of the PVA-based resin powder sieved above, the absorbance of a 0.1 wt % aqueous solution of the PVA-based resin was measured at wavelengths of 215 nm, 280 nm, and 320 nm using an ultraviolet visible near infrared spectrophotometer ("V-560" manufactured by JASCO Corporation). The measurement was performed using a sample container (cell) having a thickness of 1 cm. An absorbance ratio ($X_1/Y_1$) of an absorbance $X_1$ at 320 nm of a 0.1 wt % aqueous solution of a PVA-based resin having a particle diameter larger than 1000 μm and 1680 μm or less to an absorbance $Y_1$ at 320 nm of a 0.1 wt % aqueous solution of a PVA-based resin having a particle diameter larger than 212 μm and 500 μm or less and an absorbance ratio ($X_2/Y_2$) of an absorbance $X_2$ at 280 nm of the 0.1 wt % aqueous solution of the PVA-based resin having a particle diameter larger than 1000 μm and 1680 μm or less to an absorbance $Y_2$ at 280 nm of the 0.1 wt % aqueous solution of the PVA-based resin having a particle diameter larger than 212 μm and 500 μm or less were calculated. The results are shown in Table 1.

Example 2

The treatment was performed in the same manner as in Example 1 except that a PVA-based resin having a saponification degree after heat treatment of 71.5 mol % (measured in accordance with JIS 6726) was used, unlike in Example 1. The absorbance was measured by sieving in the same manner, and the absorbance ratios $X_1/Y_1$ and $X_2/Y_2$ were calculated in the same manner as in Example 1. The results are shown in Table 1.

Comparative Example 1

The treatment was performed in the same manner as in Example 1 except that the drying after shaking (preliminary drying) was not performed, unlike in Example 1. The absorbance was measured by sieving in the same manner, and the absorbance ratios $X_1/Y_1$ and $X_2/Y_2$ were calculated in the same manner as in Example 1. The results are shown in Table 1.

TABLE 1

|  | Absorbance (280 nm) | $X_1/Y_1$ (320 nm) | $X_2/Y_2$ (280 nm) |
| --- | --- | --- | --- |
| Example 1 | 0.48 | 0.94 | 0.84 |
| Example 2 | 0.47 | 0.92 | 0.85 |
| Comparative Example 1 | 0.47 | 0.88 | 0.74 |

In Examples 1 and 2 in Table 1 above, the value of the absorbance ratio (1000 μm to 1680 μm/212 μm to 500 μm) between particles at 320 nm and 280 nm is close to 1, indicating that the absorbance at 320 nm for coarse particles and fine particles is at the same level, which means that the difference in absorbance due to the particle diameter is small. On the other hand, it can be seen that, in Comparative Example 1, the absorbance ratio between particles is smaller than that in Examples 1 and 2, which means that the difference in absorbance due to the particle diameter is large, and a distribution occurs in the degree of heat treatment between particle diameters.

Therefore, after performing saponification and shaking of the PVA-based resin, first the drying is performed slowly with preliminary drying, then the temperature is raised, the drying is performed again, and then the PVA-based resin is subjected to the heat treatment. Thus, the degree of heat treatment between the PVA-based resin particles can be made uniform, and accordingly it is estimated that following the effects are obtained: the amount of the PVA-based resin effectively acting during the suspension polymerization of vinyl chloride is increased, the number of adsorption points for polyvinyl chloride particles is increased, and the reaction is uniform.

Although the present invention has been described in detail with reference to specific embodiments, it will be apparent to those skilled in the art that various changes and modifications can be made without departing from the spirit and scope of the present invention. The present application is based on a Japanese Patent Application (Japanese Patent Application No. 2017-097160) filed on May 16, 2017, the content of which are incorporated herein by reference.

INDUSTRIAL APPLICABILITY

The PVA-based resin of the present invention is useful as a dispersing agent, particularly is very useful as a dispersing agent for suspension polymerization of vinyl-based compounds, which is excellent in dispersibility of the obtained vinyl chloride polymer (resin) particles and has little coloration when used as a dispersing agent for suspension polymerization for vinyl compounds such as vinyl chloride, and can also be used as an auxiliary. In addition, polyvinyl chloride obtained by performing suspension polymerization using such a dispersing agent can be used for applications such as films, hoses, sheets, vinyl leather, vinyl steel sheets, waterproof canvas, painted cloth, industrial gloves, printing rolls, shoe soles, foams, dolls, and cushions.

The invention claimed is:

1. A polyvinyl alcohol-based resin comprising at least:
a polyvinyl alcohol-based resin having a particle diameter larger than 1000 μm and 1680 μm or less; and
a polyvinyl alcohol-based resin having a particle diameter larger than 212 μm and 500 μm or less,
wherein an absorbance at 280 nm of a 0.1 wt % aqueous solution of the polyvinyl alcohol-based resin is 0.3 or more; and
the polyvinyl alcohol-based resin satisfies the following Formula (1):

$$0.9 \leq X_1/Y_1 \leq 1.2 \tag{1}$$

in Formula (1), $X_1$ represents an absorbance at 320 nm of a 0.1 wt % aqueous solution of the polyvinyl alcohol-based resin having a particle diameter larger than 1000 μm and 1680 μm or less, and $Y_1$ represents an absorbance at 320 nm of a 0.1 wt % aqueous solution of the polyvinyl alcohol-based resin having a particle diameter larger than 212 μm and 500 μm or less.

2. The polyvinyl alcohol-based resin according to claim 1, further satisfying the following Formula (2):

$$0.8 \leq X_2/Y_2 \leq 1.1 \tag{2}$$

in Formula (2), $X_2$ represents an absorbance at 280 nm of the 0.1 wt % aqueous solution of the polyvinyl alcohol-based resin having a particle diameter larger than 1000 μm and 1680 μm or less, and $Y_2$ represents an absorbance at 280 nm of the 0.1 wt % aqueous solution of the polyvinyl alcohol-based resin having a particle diameter larger than 212 μm and 500 μm or less.

3. The polyvinyl alcohol-based resin according to claim 1, wherein a saponification degree of the polyvinyl alcohol-based resin is 60 mol % to 99 mol %.

4. A dispersing agent, comprising the polyvinyl alcohol-based resin according to claim 1.

5. A dispersing agent for suspension polymerization, comprising the polyvinyl alcohol-based resin according to claim 1.

6. A method for producing the polyvinyl alcohol-based resin according to claim 1, the method comprising:
- subjecting a polyvinyl alcohol-based resin having a carbonyl group in a molecule to a drying treatment;
- subjecting the polyvinyl alcohol-based resin having a carbonyl group in a molecule to a heat treatment; and
- causing a dehydration or deacetylation reaction to take place,
- wherein the drying treatment is performed before the heat treatment, and
- wherein the drying treatment and heat treatment are performed at different temperatures, and the drying treatment is performed at a lower temperature than the heat treatment.

7. A polyvinyl alcohol-based resin obtained by the method for producing a polyvinyl alcohol-based resin according to claim 6.

8. The polyvinyl alcohol-based resin according to claim 1, wherein the average degree of polymerization of the polyvinyl alcohol-based resin is 100 to 4000.

9. The method according to claim 6, wherein the drying treatment is performed at a temperature of less than 120° C., and the heat treatment is performed at a temperature of 120° C. or higher.

10. The method according to claim 9, wherein the heat treatment is performed at a temperature of 140° C. or higher.

* * * * *